US012599926B2

(12) United States Patent
Moon et al.

(10) Patent No.: US 12,599,926 B2
(45) Date of Patent: Apr. 14, 2026

(54) HOME PORT AND A SUBSTRATE-TREATING APPARATUS FOR EXHAUSTING FUME FROM A TREATMENT LIQUID

(71) Applicant: SEMES CO., LTD., Chungcheongnam-do (KR)

(72) Inventors: Jong Won Moon, Chungcheongnam-do (KR); Kyung Hun Lee, Chungcheongnam-do (KR); Eun Hyeok Choi, Chungcheongnam-do (KR); Young Jin Kim, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 486 days.

(21) Appl. No.: 18/145,928

(22) Filed: Dec. 23, 2022

(65) Prior Publication Data

US 2023/0201865 A1 Jun. 29, 2023

(30) Foreign Application Priority Data

Dec. 24, 2021 (KR) ........................ 10-2021-0186759

(51) Int. Cl.

*B05C 11/10* (2006.01)
*B05B 15/58* (2018.01)
*B05C 5/02* (2006.01)

(52) U.S. Cl.

CPC .......... *B05C 11/1039* (2013.01); *B05B 15/58* (2018.02); *B05C 5/02* (2013.01)

(58) Field of Classification Search

CPC ...... B05B 15/50; B05B 15/58; B05C 11/1039
USPC ........................................ 239/122; 134/102.2
See application file for complete search history.

(56) References Cited

U.S. PATENT DOCUMENTS 4,823,820 A * 4/1989 Larson .................... B08B 3/006 134/169 C
4,934,393 A * 6/1990 Lighthall ................ B05B 15/55 118/302
5,772,764 A * 6/1998 Akimoto ................. G03F 7/162 118/54
5,938,847 A * 8/1999 Akimoto ................. B05C 11/08 250/222.2
5,988,526 A * 11/1999 Tzeng ........................ B05B 1/28 239/119
6,248,169 B1 * 6/2001 Juang ...................... B05B 14/00 118/52

(Continued)

FOREIGN PATENT DOCUMENTS

KR 10-2016-0033358 A 3/2016
KR 10-2019-0074533 A 6/2019

*Primary Examiner* — Karl Kurple

(74) *Attorney, Agent, or Firm* — Carter, DeLuca & Farrell LLP

(57) ABSTRACT

Provided is a home port in which a nozzle supplying a treating liquid to a substrate waits. The home port includes a drain cup, a housing provided to cover the drain cup and having an exhaust space exhausting a fume generated from the treating liquid, and an insertion body placed between an upper wall of the housing and the drain cup in the housing. A first exhaust passage guiding the fume to the exhaust space is formed between the insertion body and the drain cup, and a second exhaust passage guiding the fume to the exhaust space is formed between the insertion body and the housing.

10 Claims, 15 Drawing Sheets

(56) References Cited

U.S. PATENT DOCUMENTS 6,494,953 B2 * 12/2002 Hayes ............... H01L 21/67017 118/302
7,357,840 B2 * 4/2008 Nguyen .............. H01L 21/6708 118/302
7,591,902 B2 * 9/2009 Rangarajan ......... H01L 21/6715 118/712
7,597,767 B1 * 10/2009 Fathbruckner .......... B05B 15/55 15/422.2
7,998,308 B2 * 8/2011 Kaneko ............. H01L 21/68728 134/119
8,201,568 B2 * 6/2012 Ito ..................... H01L 21/67051 134/147
8,221,641 B2 * 7/2012 Nguyen .............. H01L 21/6708 438/745
8,739,729 B2 * 6/2014 Ryu .................. H01L 21/67248 118/313
9,168,553 B2 * 10/2015 Bellroth ................. B44D 3/006
10,825,699 B2 * 11/2020 Jung ................... H01L 21/6835
12,134,055 B2 * 11/2024 Schlichenmaier ...... B05B 14/00
2005/0072733 A1 * 4/2005 Consolini ........... H01L 21/6715 451/36
2005/0188919 A1 * 9/2005 Nguyen ............ H01L 21/67086 118/52
2007/0240824 A1 * 10/2007 Kaneko ............. H01L 21/68728 118/52
2010/0031980 A1 * 2/2010 Ito ..................... H01L 21/67051 134/104.2
2010/0098869 A1 * 4/2010 Kinoshita ........... H01L 21/6715 427/421.1
2012/0042912 A1 * 2/2012 Saint ....................... B05B 14/49 134/99.1
2013/0040062 A1 * 2/2013 Kinoshita ............... B05B 12/08 427/421.1
2014/0352730 A1 * 12/2014 Kai ................... H01L 21/67051 134/104.1
2019/0189471 A1 * 6/2019 Jung ................... H01L 21/6835
2020/0070196 A1 * 3/2020 Kamimura .............. B05B 14/00
2024/0042493 A1 * 2/2024 Jeon .................. H01L 21/67051
2024/0047236 A1 * 2/2024 Song ................... H01L 21/6715
2024/0160119 A1 * 5/2024 Hong ................ H01L 21/67051
2025/0091077 A1 * 3/2025 Kang ...................... B05B 15/50

* cited by examiner

PRIOR ART

PRIOR ART

HOME PORT AND A SUBSTRATE-TREATING APPARATUS FOR EXHAUSTING FUME FROM A TREATMENT LIQUID

CROSS-REFERENCE TO RELATED APPLICATIONS

This application claims priority to and the benefit of Korean Patent Application No. 10-2021-0186759 filed in the Korean Intellectual Property Office on Dec. 24, 2022, the entire contents of which are incorporated herein by reference.

TECHNICAL FIELD

The present invention relates to an apparatus for treating a substrate, and more particularly, to a home port in which a nozzle ejecting a treatment liquid to a substrate and an apparatus for treating a substrate, which includes the same.

BACKGROUND ART

A semiconductor process includes a process of cleaning a thin film, foreign substances, and particles. There processes are performed by placing the substrate on a spin head so that a pattern side faces up or down, supplying a treatment liquid to the substrate while rotating the spin head, and then drying a wafer.

A nozzle supplying the treatment liquid to the wafer is mounted on a support member, and the support member is provided to move between a waiting location and a process location by a driver. The waiting location is a location where the nozzle waits before supplying the treatment liquid and the process location is a location where the nozzle is placed when processing the substrate with the treatment liquid. In general, the substrate is treated in a cup in order to prevent scattering of the treatment liquid, and the nozzle waits in a home port location at one side of the cup. While the nozzle moves to the home port, and waits, the treatment liquid is ejected into the home port from the nozzle in order to prevent the treatment liquid from being solidified in the nozzle. Further, when the nozzle waits for a long time, and then moves to the process location, the treatment liquid is first ejected from the home port so that the treatment liquid can be smoothly ejected to the wafer.

FIG. 1 is a diagram schematically illustrating a structure of a general home port 900.

Referring to FIG. 10, the home port 900 has a drain cup 920 and a housing 940. The drain cup 920 has an accommodation space 922 of which an upper portion is opened, and a drain port 924 is formed on the bottom of the drain cup 920. The housing 940 is provided to cover a side portion and the upper portion of the drain cup 920. An exhaust port 944 is formed on a lower wall of the housing 940. A fume generated from the treatment liquid ejected from the nozzle 964 to the accommodation space 922 of the drain cup 920 and a fume generated from the treatment liquid which resides in the drain cup 920 are introduced into the exhaust space 942 formed between the drain cup 920 and the housing 940, and then exhausted to the outside of the housing 940 through an exhaust pipe 980 connected to the exhaust port 924.

A clearance between an upper end 926 of the drain cup 920 and an upper wall 946 of the housing 940 is provided as an exhaust passage P in which the fume in the drain cup 820 flows. In general, an exhaust passage P is narrow as illustrated in FIG. 1. As a result, as illustrated in FIG. 2, when a large quantity of fumes are generated form the treatment liquid, the fumes are not smoothly discharged through the exhaust passage P, but attached to an outer surface of the nozzle 962, and then when the nozzle 962 moves to the process location, the fumes become a contamination source that contaminates the wafer.

Further, a plurality of nozzles 962 may be mounted on a support arm 964, an acid liquid may be supplied form one of the nozzles 962, and an alkaline liquid may be ejected from the other one. In this case, an acid fume and an alkaline fume are simultaneously generated. The acid fume and the alkaline fume react to each other to generate alkali on the surface of the nozzle 962.

SUMMARY OF THE INVENTION

The present invention has been made in an effort to provide a home port capable of smoothly exhausting a fume generated from a treatment liquid and an apparatus for treating a substrate, which includes the same.

The present invention has also been made in an effort to provide an apparatus for treating a substrate, which is capable of preventing a nozzle from being contaminated while the nozzle waits in the home port.

The problem to be solved by the present invention is not limited to the above-mentioned problems, and the problems not mentioned will be clearly understood by those skilled in the art from the present specification and the accompanying drawings.

An exemplary embodiment of the present invention provides an apparatus for treating a substrate. According to an exemplary embodiment, the apparatus for treating a substrate includes: a treating unit configured to liquid-treating a substrate; a home port provided outside the treating unit; and a nozzle unit supplying a treating liquid to a substrate positioned in the treating unit, and having a nozzle provided to be movable between a process location at which the treating unit performs the liquid-treating for the substrate and a waiting location of waiting in the home port, in which the home port has a drain cup having an accommodation space accommodating the treating liquid ejected from the nozzle, and a housing provided to cover the drain cup and having an exhaust space which exhausts a fume generated from the treating liquid, a first exhaust passage and a second exhaust passage through which the fume generated from the treating liquid in the drain cup flows to the exhaust space are provided in the home port, and the second exhaust passage is positioned above the first exhaust passage.

According to an example, the first exhaust passage may be provided above the drain cup at a location adjacent to the drain cup.

According to an example, the housing may have an upper wall in which an inlet placed above the drain cup and the treating liquid ejected from the nozzle unit is introduced is formed, and the second exhaust passage may be provided below the upper wall at a location adjacent to the upper wall.

According to an example, the first exhaust passage and/or the second exhaust passage may be provided in a ring shape.

According to an example, the home port may further include an insertion body having a through hole penetrated in a vertical direction, the insertion body may have a body positioned to be spaced apart from an inner wall of the housing, the body may be placed at a location higher than the drain cup and lower than the upper wall of the housing, a first clearance between the body and the drain cup may be provided as the first exhaust passage, and a second clearance between the body and the upper wall of the housing may be provided as the second exhaust passage.

According to an example, the housing may include a lower body covering a side portion and a lower portion of the drain cup, and an upper body positioned above the lower body, the insertion body may further include a support base, and connection rods connecting the body and the support base, an upper end of the lower body may be positioned to be higher than an upper end of the drain cup, a bottom of the support base may be supported by the lower body, the upper body may be supported by the support base, and the fume exhausted through the second exhaust passage may be provided to flow to the exhaust space through a space between the connection rods.

According to an example, a length of the body in the vertical direction may be provided to be larger than the first clearance and the second clearance.

According to an example, the fume exhausted through the first exhaust passage and the fume exhausted through the second exhaust passage may be exhausted through the same exhaust space.

According to an example, an exhaust pipe in which a depressurization member is installed may be connected to the exhaust space, and an exhaust route from the first exhaust passage up to the exhaust pipe may be provided to be shorter than an exhaust route from the second exhaust passage up to the exhaust pipe.

According to an example, the exhaust space may include a first exhaust space and a second exhaust space, the housing may further include an inner housing placed to cover the drain cup, and having the first exhaust space from the drain cup, and an outer housing placed to cover the inner housing, and having the second exhaust space from the inner housing, the fume which flows through the first exhaust passage may be connected to the first exhaust space, and the second exhaust passage may be connected to the second exhaust space.

According to an example, the home port may further include an insertion body having a through hole penetrated in a vertical direction, the insertion body may have a body, the body may be placed at a location higher than the drain cup and lower than the upper wall of the outer housing, a first clearance between the body and the drain cup may be provided as the first exhaust passage, and a second clearance between the body and the upper wall of the outer housing may be provided as the second exhaust passage.

According to an example, an upper end of the inner housing may be positioned at a location higher than the upper end of the drain cup, and a lower end of the body may be supported by the upper end of the inner housing.

According to an example, a first exhaust pipe may be connected to the first exhaust space, a second exhaust pipe may be connected to the second exhaust space, the first exhaust pipe and the second exhaust pipe may be connected to an integrated exhaust pipe, and a depressurization member may be installed in the integrated exhaust pipe.

According to an example, the nozzle unit may include a base block, and a plurality of nozzle members coupled to the base block and having nozzles, the plurality of nozzle members may be coupled to the base block in line in one direction, and a longitudinal direction of the inlet through which the treating liquid ejected from the nozzle may be provided in parallel to a direction in which the nozzles are arranged when the nozzle unit is positioned at the waiting location in each of the housing and the drain cup.

Another exemplary embodiment of the present invention provides a home port in which a nozzle supplying a treating liquid to a substrate waits. The home port includes: a drain cup having an accommodation space accommodating the treating liquid ejected from the nozzle; a housing provided to cover the drain cup and having an exhaust space which exhausts a fume generated from the treating liquid; and an insertion body placed between an upper wall of the housing and the drain cup in the housing, in which a first exhaust passage guiding a fume to the exhaust space is formed between the insertion body and the drain cup, a second exhaust passage guiding the fume to the exhaust space is formed between the insertion body and the housing, the second exhaust passage is provided at a higher location than the first exhaust passage, and the treating liquid ejected from the nozzle unit is introduced into the drain cup through the inlet formed on the upper wall and a through hole formed in the insertion body.

According to an example, each of the first exhaust passage and the second exhaust passage may be provided in a ring shape, the housing may be connected to the exhaust space at a location lower than the upper end of the drain cup, and an exhaust pipe in which a depressurization member is installed may be connected to the exhaust space.

According to an example, the first exhaust passage and the second exhaust passage may be provided to guide the fume to the same exhaust space.

According to an example, an exhaust pipe in which a depressurization member is installed may be connected to the exhaust space, and an exhaust route from the first exhaust passage up to the exhaust pipe may be provided to be shorter than an exhaust route from the second exhaust passage up to the exhaust pipe.

According to an example, the housing may include a lower body covering a side portion and a lower portion of the drain cup, and an upper body positioned above the lower body, the insertion body may further include a support base, and connection rods connecting the body and the support base, an upper end of the lower body may be positioned to be higher than an upper end of the drain cup, a bottom of the support base may be supported by the lower body, the upper body may be supported by the support base, and the fume exhausted through the second exhaust passage may be provided to flow to the exhaust space through a space between the connection rods.

Further, yet another exemplary embodiment of the present invention provides an apparatus for treating a substrate, which includes: a treating unit configured to liquid-treating a substrate; a home port provided outside the treating unit; and a nozzle unit supplying a treating liquid to a substrate positioned in the treating unit, and having a nozzle provided to be movable between a process location at which the treating unit performs the liquid-treating for the substrate and a waiting location of waiting in the home port, in which the home port includes a drain cup having an accommodation space accommodating the treating liquid ejected from the nozzle, a housing provided to cover the drain cup and having an exhaust space which exhausts a fume generated from the treating liquid, and an insertion body placed between an upper wall of the housing and the drain cup in the housing, a first exhaust passage guiding fumes to the exhaust space is formed between the insertion body and the drain cup, a second exhaust passage guiding the fume to the exhaust space is formed between the insertion body and the housing, the second exhaust passage is provided at a higher location than the first exhaust passage, and an exhaust pipe in which a depressurization member is installed is connected to the exhaust space, and an exhaust route from the first exhaust passage up to the exhaust pipe is provided to be shorter than an exhaust route from the second exhaust passage up to the exhaust pipe.

According to an exemplary embodiment of the present invention, when a nozzle waits in a home port, a fume generated from a treatment liquid can be smoothly discharged from the home port, thereby preventing the nozzle from being contaminated due to the fume.

The effect of the present invention is not limited to the foregoing effects, and non-mentioned effects will be clearly understood by those skilled in the art from the present specification and the accompanying drawings.

Figure 10:
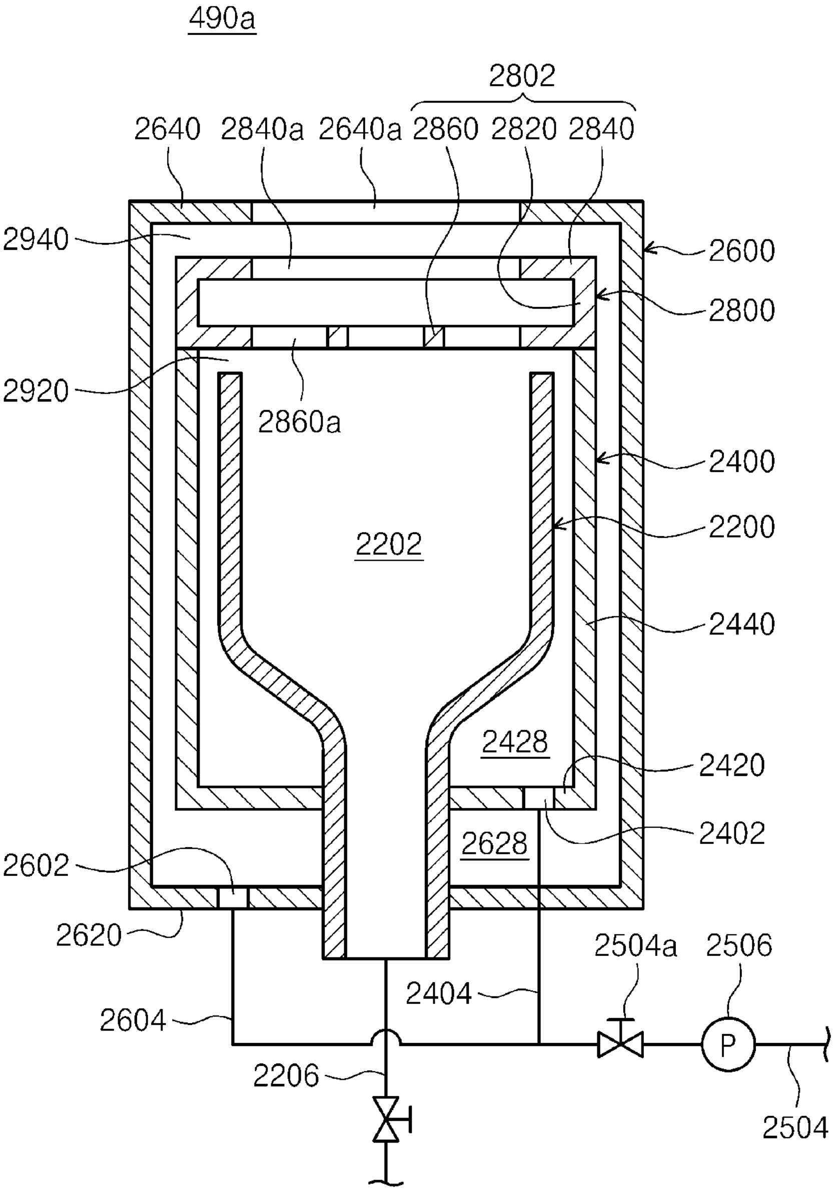
FIG. 10 is a cross-sectional view schematically illustrating another exemplary embodiment of the home port of FIG. 6.
Figure 12:
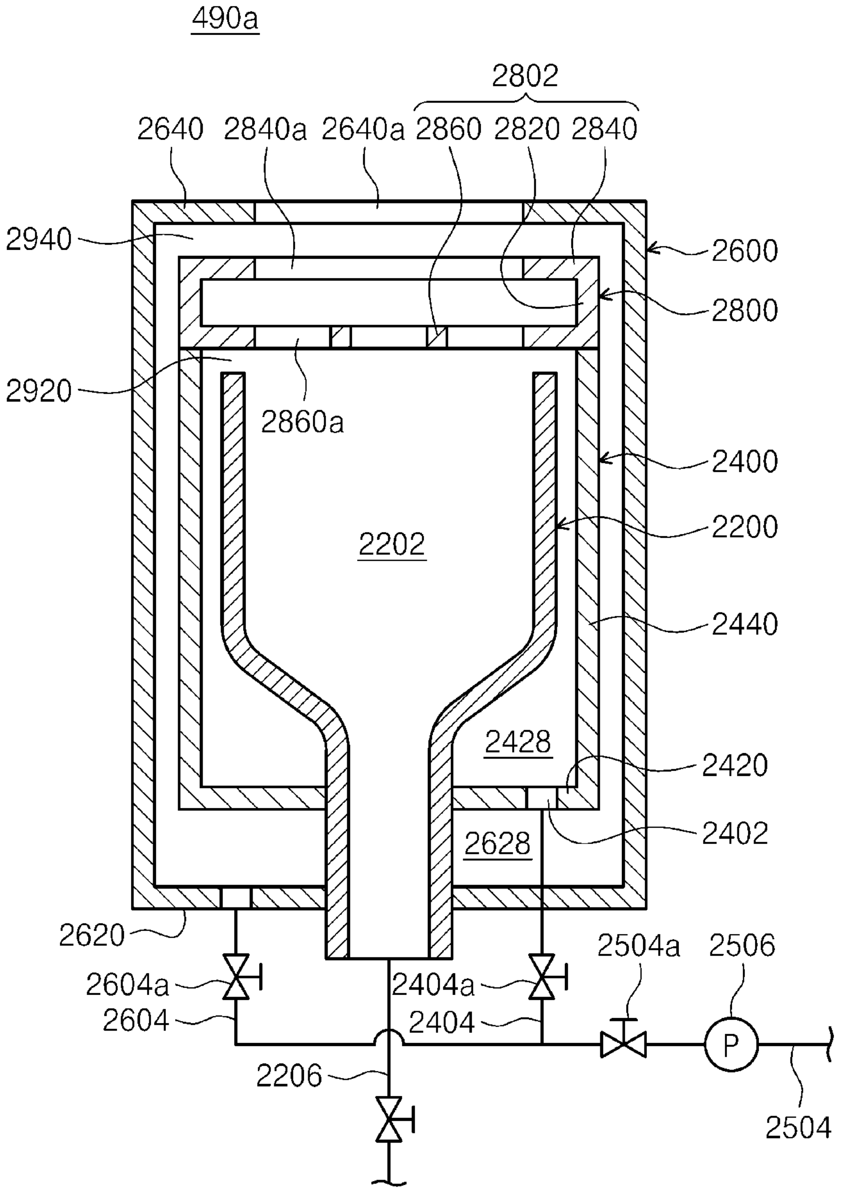
Figure 13:
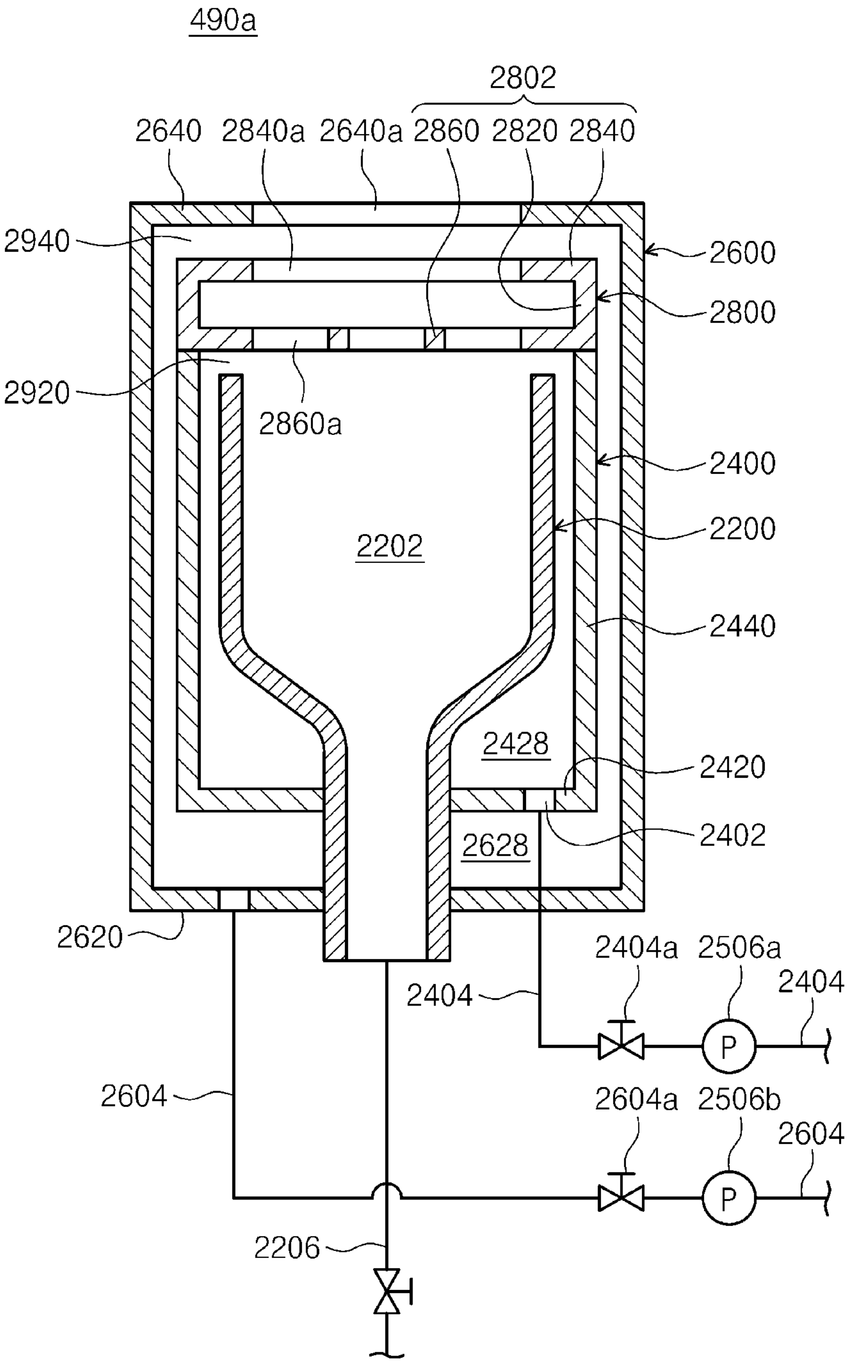

Each of FIGS. 12 and 13 is a diagram schematically illustrating a modified example of the home port of FIG. 10.

Figure 14:
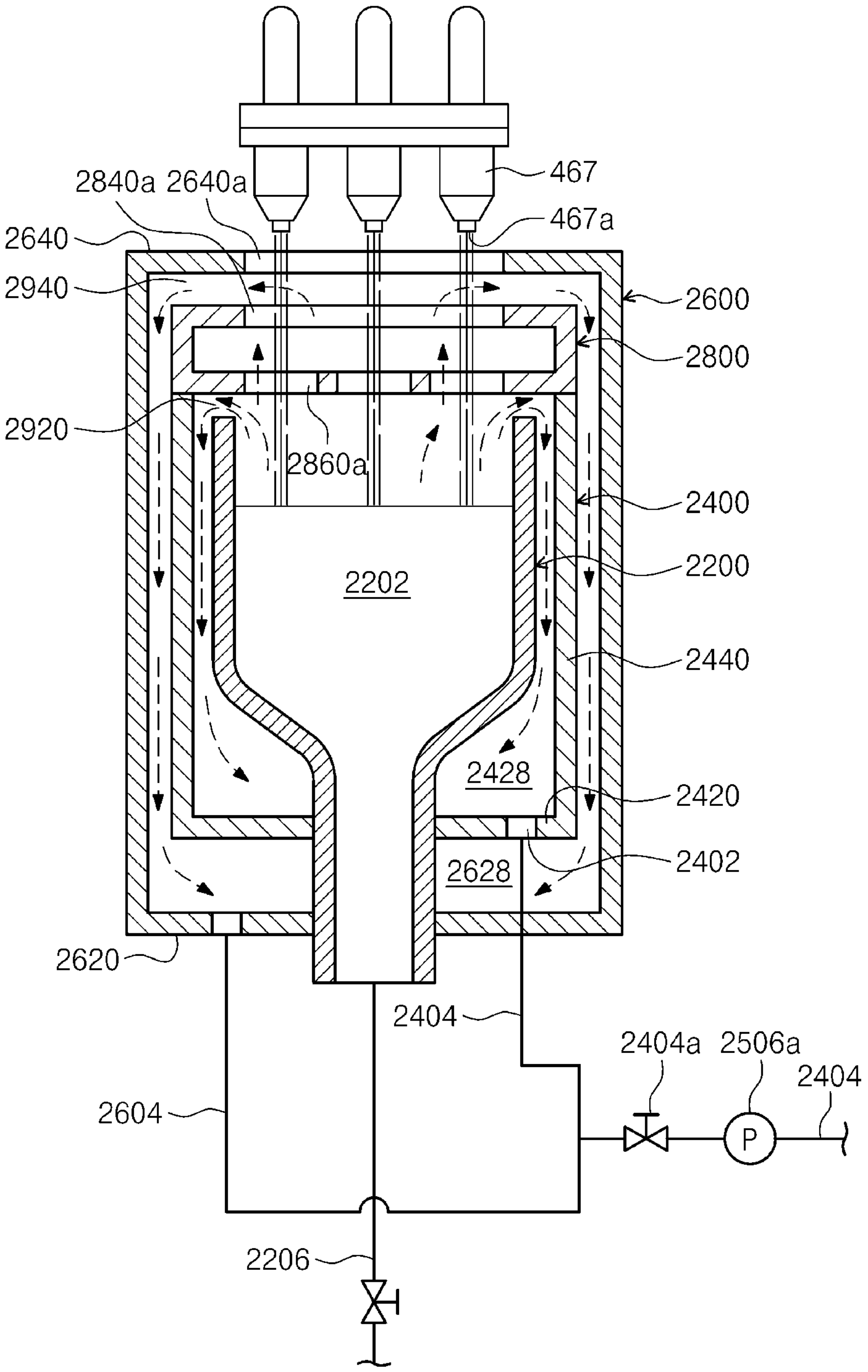

FIG. 14 is a diagram illustrating a state in which the fume is discharged from the home port of FIG. 10.

Figure 6:
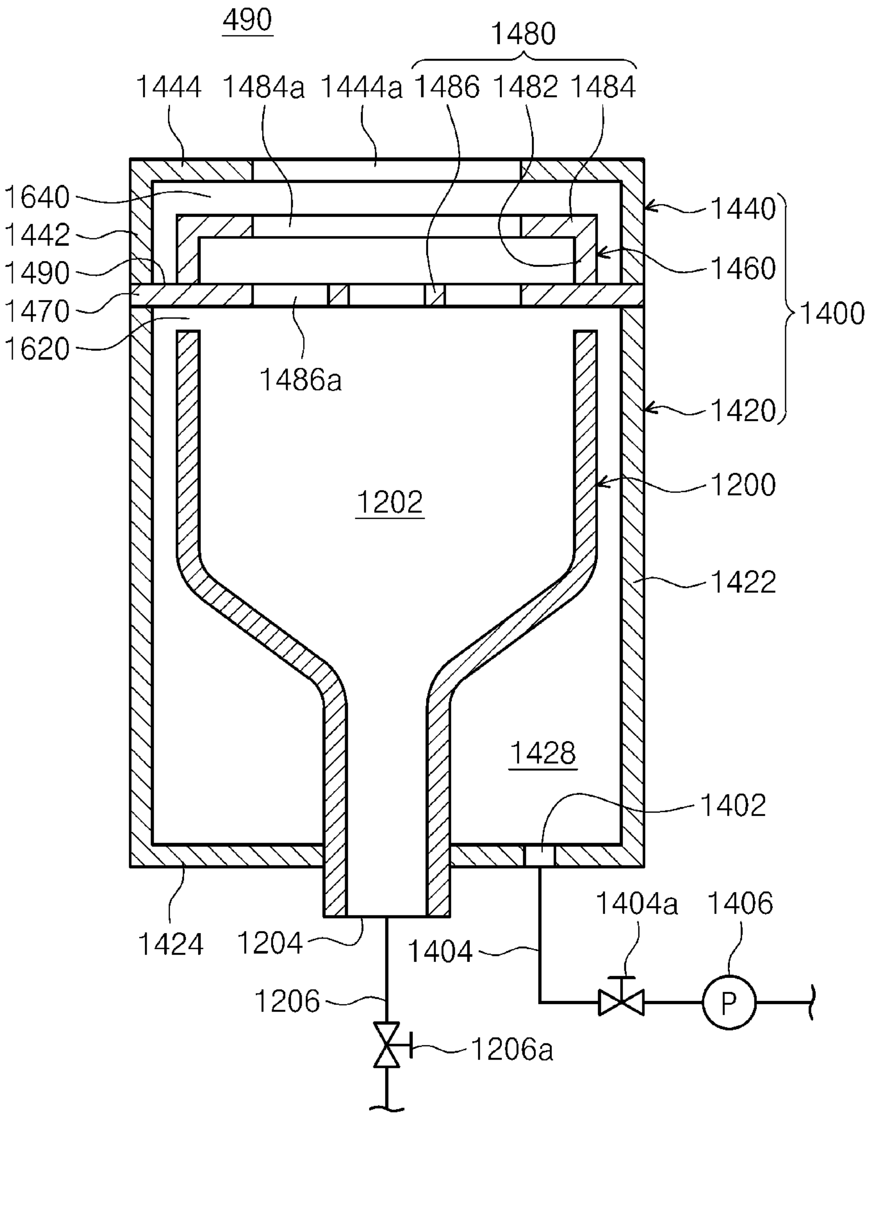
FIG. 6 is a cross-sectional view schematically illustrating an exemplary embodiment of the home port of FIG. 4.
Figure 15:
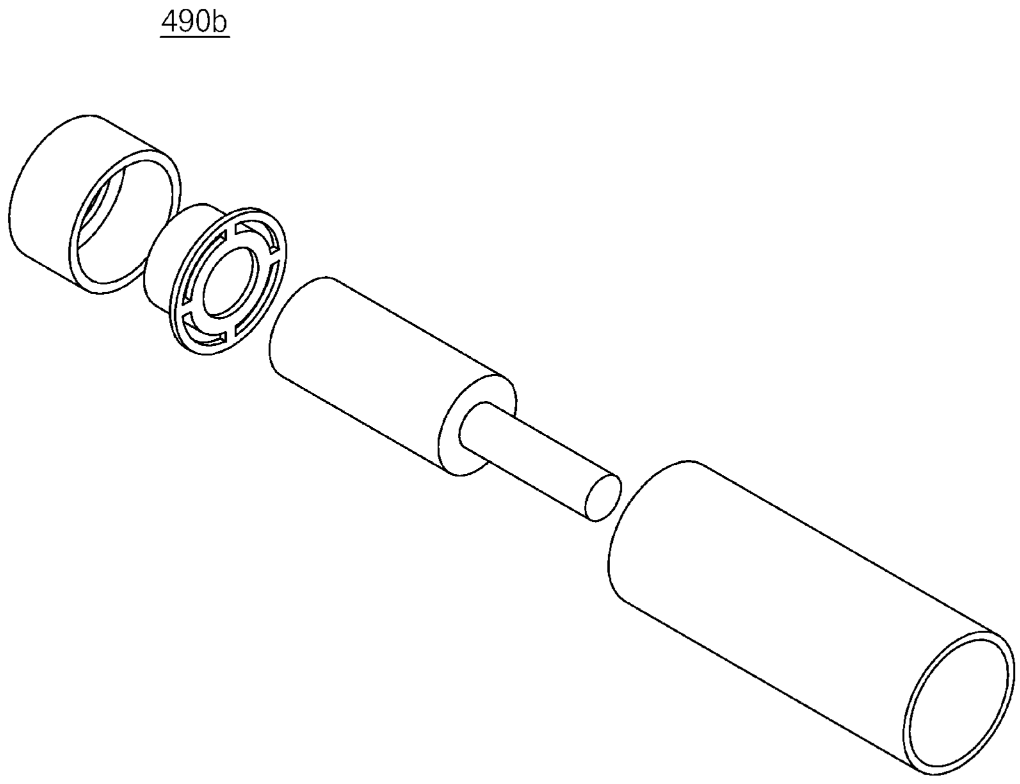

FIG. 15 is an exploded perspective view schematically illustrating yet another exemplary embodiment of the home port of FIG. 6.

DETAILED DESCRIPTION

Hereinafter, an exemplary embodiment of the present invention will be described in more detail with reference to the accompanying drawings. The exemplary embodiment of the present invention can be modified in various forms, and it should not be construed that the scope of the present invention is limited to embodiments described below. The exemplary embodiments are provided to more completely describe the present invention to those skilled in the art. Therefore, a shape of an element in the drawing is exaggerated in order to emphasizing a more definite description.

Figure 1:
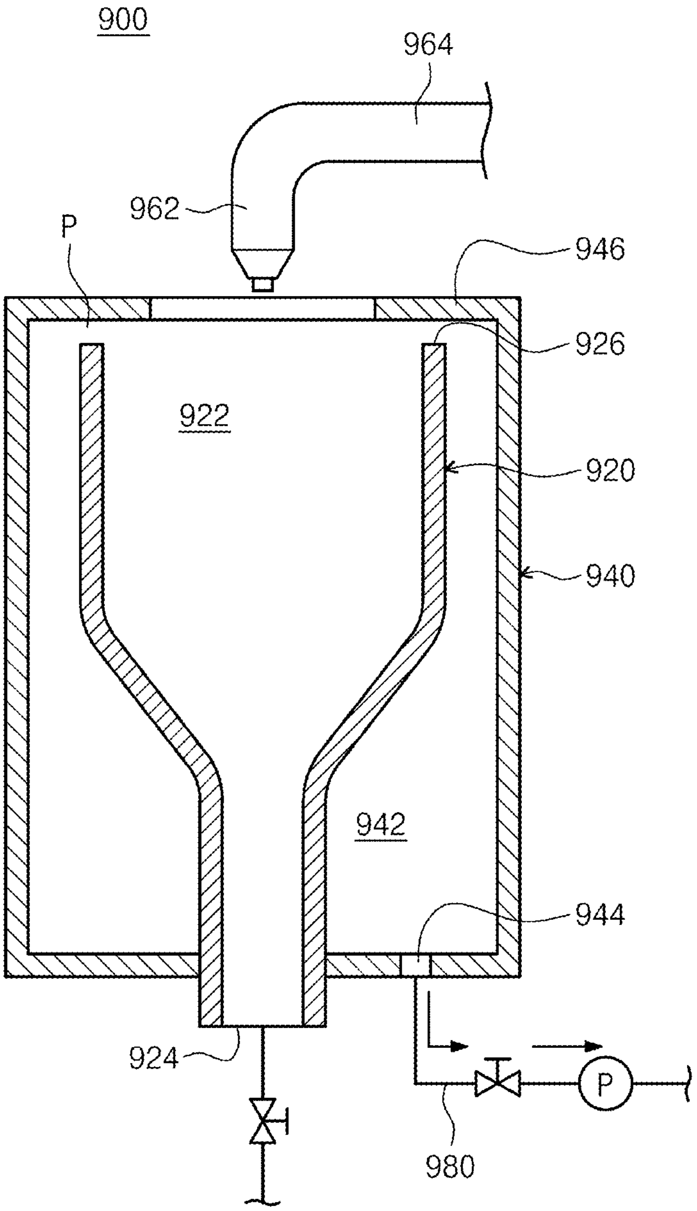
FIG. 1 is a diagram schematically illustrating a structure of a general home port.
Figure 2:
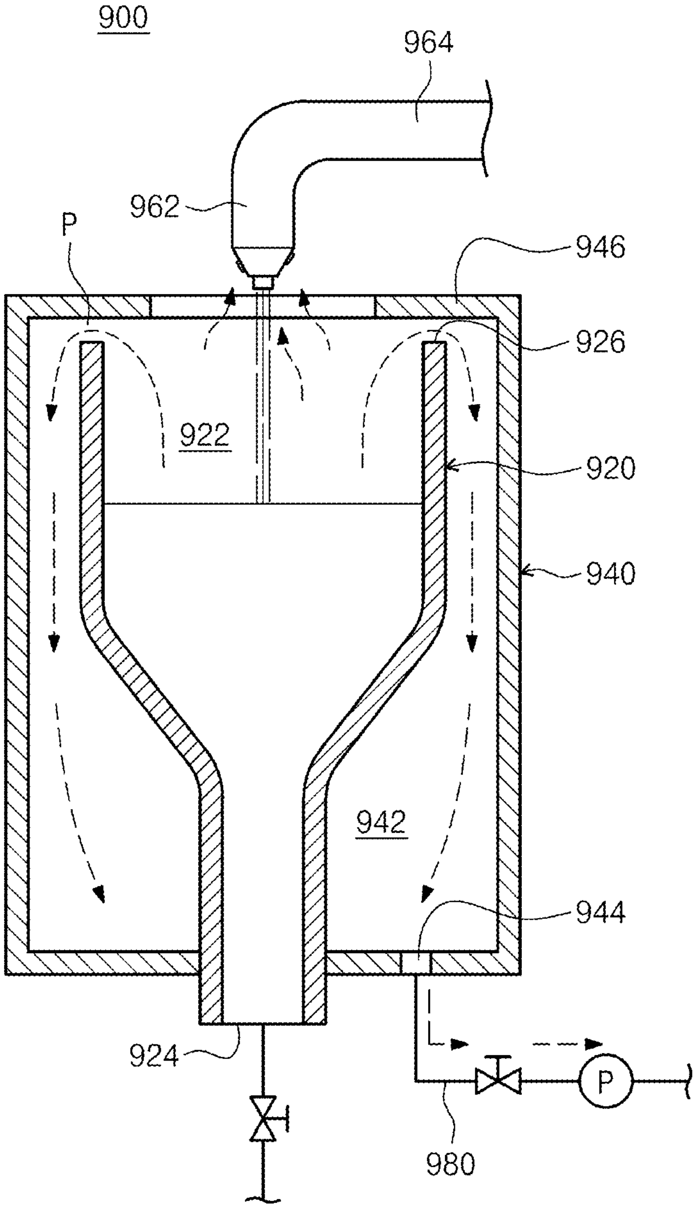
FIG. 2 is a diagram schematically illustrating a state in which a fume is discharged from the home port of FIG. 1.
Figure 3:
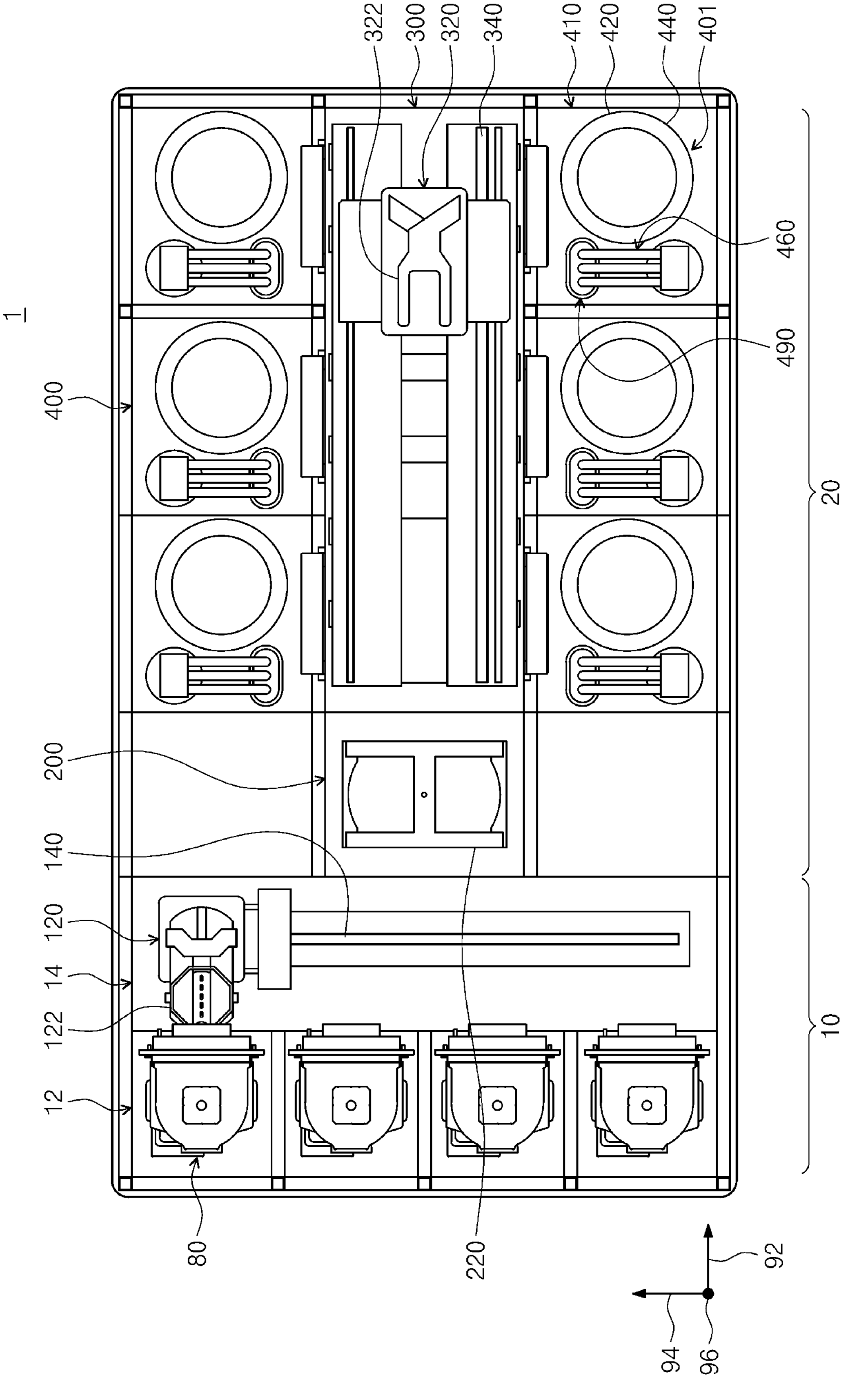
FIG. 3 is a plan view schematically illustrating an apparatus for treating a substrate according to an exemplary embodiment of the present invention.

FIG. 3 is a plan view schematically illustrating an apparatus for treating a substrate according to an exemplary embodiment of the present invention.

Referring to FIG. 3, the substrate treating apparatus includes an index module 10, a treating module 20, and a controller 30. According to an exemplary embodiment, the index module 10 and the treating module 20 may be arranged in one direction. Hereinafter, a direction in which the index module 10 and the treating module 20 are placed will be referred to as a first direction 92, a direction vertical to the first direction 92 when viewed from the top will be referred to as a second direction 94, and a direction vertical to both the first direction 92 and the second direction 94 will be referred to as a third direction 96.

The index module 10 transfers a substrate W to the treating module 20 from a container 80 storing the substrate W and stores the substrate W of which treating is completed in the container 80. A longitudinal direction of the index module 10 is provided as the second direction 94. The index module 10 has a load port 12 and an index frame 14. The load port 12 is positioned at an opposite side to the treating module 20 based on the index frame 14. The container 80 storing the substrates W is placed in the load port 12. A plurality of load ports 12 may be provided, and the plurality of load ports 12 may be arranged in the second direction 94.

A sealing container such as a front opening unified pod (FOUP) may be used as the container 80. The container 80 may be placed on the load port 12 by a transportation means (not illustrated) such as an overhead transfer, an overhead conveyor, or an automatic guided vehicle or a worker.

An index robot 120 is provided in the index frame 14. A guide rail 136 in which the longitudinal direction is provided as the second direction 14 may be provided in the index frame 14, and the index robot 120 may be provided to be movable on the guide rail 140.

The index robot 120 may include a hand 122 on which the substrate W is placed, and the hand 122 may be provided to be movable forward and backward, rotatable with the third direction 96 as an axis and movable in the third direction 96. A plurality of hands 122 may be provided to be spaced apart from each other in a vertical direction, and the hands 122 may move forward and backward independently from each other.

The treating module 20 includes a buffer unit 200, a transfer chamber 300, and a treating chamber 400. The buffer unit 200 provides a space in which the substrate W loaded into the treating module 20 and the substrate W unloaded from the treating module 20 temporarily stay. The treating chamber 400 performs a treating process of supplying a liquid onto the substrate W and liquid-treating the substrate W. The transfer chamber 300 transfers the substrate W between the buffer unit 200 and the liquid treating chamber 400. The longitudinal direction of the transfer chamber 300 may be provided as the first direction 92. The buffer unit 200 may be arranged between the index module 10 and the transfer chamber 300. A plurality of liquid treating chambers 400 may be provided, and arranged at a side portion of the transfer chamber 300. The liquid treating chamber 400 and the transfer chamber 300 may be arranged in the second direction 94. The buffer unit 200 may be positioned at one end of the transfer chamber 300.

According to an example, the liquid treating chambers 400 are arranged at both sides of the transfer chamber 300, respectively. The liquid treating chambers 400 may be provided an array of A×B (each of A and B is 1 or a natural number larger than 1) in both sides of the transfer chambers 300 in the first direction 92 and the third direction 96, respectively. The transfer chamber 300 has the transfer robot 320. A guide rail 136 in which the longitudinal direction is provided as the first direction 92 may be provided in the transfer chamber 300, and the transfer robot 320 may be provided to be movable on the guide rail 340. The transfer robot 320 may include a hand 322 on which the substrate W is placed, and the hand 322 may be provided to be movable forward and backward, rotatable with the third direction 96 as the axis, and movable in the third direction 96. A plurality of hands 322 may be provided to be spaced apart from each other in the vertical direction, and the hands 322 may move forward and backward independently from each other.

The buffer unit 200 includes a plurality of buffers 220 on which the substrate W is placed. The buffers 220 may be arranged to be spaced apart from each other in the third direction 96. A front face and a rear face of the buffer unit 200 are opened. The front face is a face facing the index module 10 and the rear face is a face facing the transfer chamber 300. The index robot 120 may access the buffer unit 200 through the front face, and the transfer robot 320 may access the buffer unit 200 through the rear face.

Figure 4:
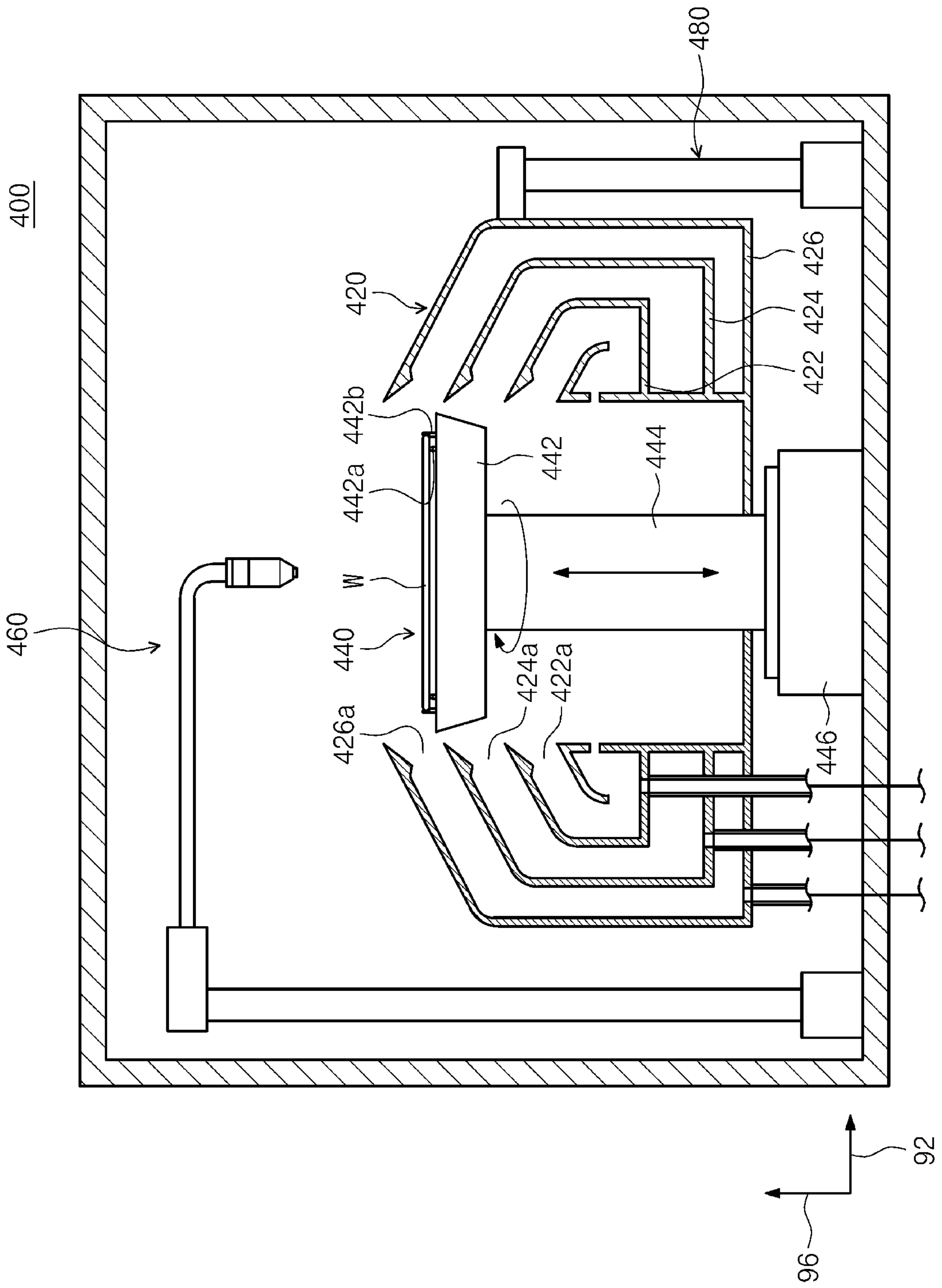
FIG. 4 is a view schematically illustrating an exemplary embodiment of a liquid treating chamber in FIG. 3.

FIG. 4 is a diagram schematically illustrating an exemplary embodiment of a liquid treating chamber 400 of FIG. 3. Referring to FIG. 4, the liquid treating chamber 400 includes a treating unit 401, a nozzle unit 460, and a home port 490. The treating unit 401 has a housing 410, a cup 420, a support unit 440, and an elevation unit 480.

The housing 410 is provided in a substantially rectangular parallelepiped shape. The cup 420, the nozzle unit 460, and the home port 490 are arranged inside the housing 410.

The cup 420 has a treating space of which an upper portion is opened, and the substrate W is liquid-treated inside the treating space. The support unit 440 supports the substrate W in the treating space. The liquid supply unit 460 may supply the liquid to the substrate W supported on the support unit 440. A plurality of types of liquids may be provided and sequentially supplied onto the substrate W. The elevation unit 480 adjusts a relative height between the cup 420 and the support unit 440.

According to an example, the cup 420 has a plurality of recovery tanks 422, 424, and 426. Each of the recovery tanks 422, 424, and 426 have a recovery space that recovers the liquid used for treating the substrate. Each of the recovery tanks 422, 424, and 426 is provided in a ring shape of covering the support unit 440. When the liquid treating process is conducted, a treating liquid scattered by rotation of the substrate W is introduced into the recovery space through inlets 422*a*, 424*a*, and 426*a* of the respective recovery tanks 422, 424, and 426. According to an example, the cup 420 has a first recovery tank 422, a second recovery tank 424, and a third recovery tank 426. The first recovery tank 422 is arranged to cover the support unit 440, the second recovery tank 424 is arranged to cover the first recovery tank 422, and the third recovery tank 426 is arranged to cover the second recovery tank 424. A second inlet 424*a* for introducing the liquid into the second recovery tank 424 may be positioned above the first inlet 422*a* for introducing the liquid into the first recovery tank 422, and a third inlet 426*a* for introducing the liquid into the third recovery tank 426 may be positioned above the second inlet 424*a*.

The support unit 440 has a support plate 442 and a driving axis 444. An upper surface of the support plate 442 may be provided in a substantially circular shape, and have a larger diameter than the substrate W. A support pin 442*a* supporting the rear face of the substrate W may be provided at a center of the support plate 442, and the support pin 442*a* is provided for an upper end thereof to protrude from the support plate 442 so that the substrate W is spaced apart from the support plate 442 by a predetermined distance. A chuck pin 442*b* is provided at an edge of the support plate 442. The chuck pin 442*b* is provided to protrude upward from the support plate 442, and when supports the side portion f the substrate W so that the substrate W is not separated from the support unit 440. The driving axis 444 is drive by the driver 446, and connected to a bottom center of the substrate W, and rotates 442 around a central axis.

Figure 5:
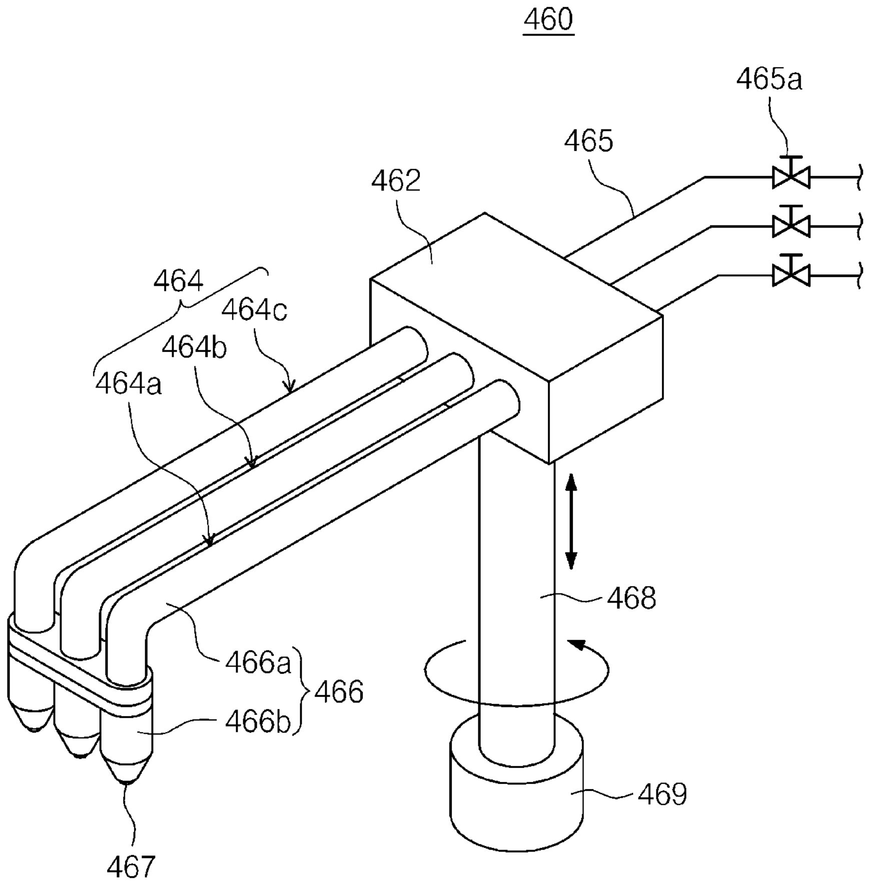
FIG. 5 is a diagram schematically illustrating an example of a nozzle unit according to an exemplary embodiment of the present invention.

The elevation unit 480 moves the cup 420 in the vertical direction. The relative height between the cup 420 and the substrate W is changed by vertical movement of the cup 420. As a result, since the recovery tanks 422, 424, and 426 recovering the treating liquid are changed according to the type of liquid supplied by the substrate W, the liquids may be separated and recovered. Unlike the above description, the cup 420 may be fixedly installed, and the elevation unit 480 may move the support unit 440 in the vertical direction. FIG. 5 is a diagram schematically illustrating an exemplary embodiment of a nozzle unit. The nozzle unit 460 supplies the treating liquid to the substrate.

Referring to FIG. 5, the nozzle unit 460 includes a base block 462, a plurality of nozzle members 464, a driving axis 468, and a driver 469. The base block 462 has the substantially rectangular parallelepiped shape. The plurality of nozzle members 464 is fixedly coupled to the base block 462. According to an example, a first nozzle member 464*a*, a second nozzle member 464*b*, and a third nozzle member 464*c* may be mounted on the base block 462. The first nozzle member 464*a*, the second nozzle member 464*b*, and the third nozzle member 464*c* supply different treating liquids. According to an example, the first nozzle member 464*a*, the second nozzle member 464*b*, and the third nozzle member 464*c* may eject liquids having a similar property. For example, the first nozzle member 464*a*, the second nozzle member 464*b*, and the third nozzle member 464*c* may eject a liquid having an acid component. Optionally, the first nozzle member 464*a* and the second nozzle member 464*b* may eject the liquid having the acid component, and the third nozzle member 464*c* may eject water. For example, the first nozzle member 464*a* may eject sulfuric acid, the second nozzle member 464*b* may eject hydrofluoric acid, and the third nozzle member 464*c* may eject water. Optionally, the first nozzle member 464*a*, the second nozzle member 464*b*, and the third nozzle member 464*c* may eject liquids having different properties. For example, the first nozzle member 464*a* may eject a liquid having an acid component, the second nozzle member 464*b* may eject a liquid having an alkali component, and the third nozzle member 464*c* may eject water.

The first nozzle member 464*a*, the second nozzle member 464*b*, and the third nozzle member 464*c* may be provided in the same shape. Hereinafter, a structure of the first nozzle member 464*a* will be described.

The first nozzle member 464*a* has a support arm 466 and a nozzle 467. The support arm 466 has a horizontal rod unit 466*a* and a vertical rod unit 466*b*. The horizontal rod unit 66*a* extends from the front face of the base block 462 to the ground in the horizontal direction. The vertical rod unit 466*b* extends downward from the end of the horizontal rod unit 466*a*. A connection portion of the vertical rod unit 466*b* and the horizontal rod unit 466*a* may be provided in a rounded shape. The nozzle 467 is mounted on a lower end of the vertical rod unit 466*b*. The treating liquid supply pipe 465 is connected to the rear face of the base block 462. A valve 465*a* is installed in the treating liquid supply pipe 465. A flow path (not illustrated) in which the treating liquid supplied through the treating liquid supply pipe 465 is formed in the support arm 466. The base block 462 is supported by the driving axis 468, and the driver 469 is coupled to the driving axis 468. The driver 469 is moved in the vertical direction by the driving axis 468, and further, rotates the driving axis 468 based on a central axis. The nozzle 467 moves between the process location and the waiting location by the rotation of the driving axis 468. At the process location, the nozzle 467 ejects the treating liquid to the substrate supported on the support unit to perform liquid-treatment for the substrate. While the liquid-treatment is not conducted for the substrate, the nozzle 467 waits at the waiting location.

While the nozzles 467 are positioned at the waiting location, an auto-dispense operation and a pre-dispense operation are performed. The auto-dispense operation is an operation of ejecting the treating liquid at a predetermined time interval when the nozzles 467 wait at the waiting location for a long time. The treating liquid is prevented from being solidified in the nozzle unit 460 by the auto-dispense operation. The pre-dispense operation is an operation of previously ejecting the treating liquid at the waiting location before ejecting the treating liquid to the substrate from the nozzle 467. The treating liquid is smoothly ejected at the time of ejecting the treating liquid to the substrate by the pre-dispense operation.

The home port 490 is placed outside the cup 420. When viewed from the top, the waiting location of the nozzle 468 is overlapped with the home port 490. FIG. 6 is a cross-sectional view schematically illustrating an exemplary embodiment of the home port of FIG. 4 and FIG. 7 is an exploded perspective view of the home port of FIG. 6.

Figure 7:
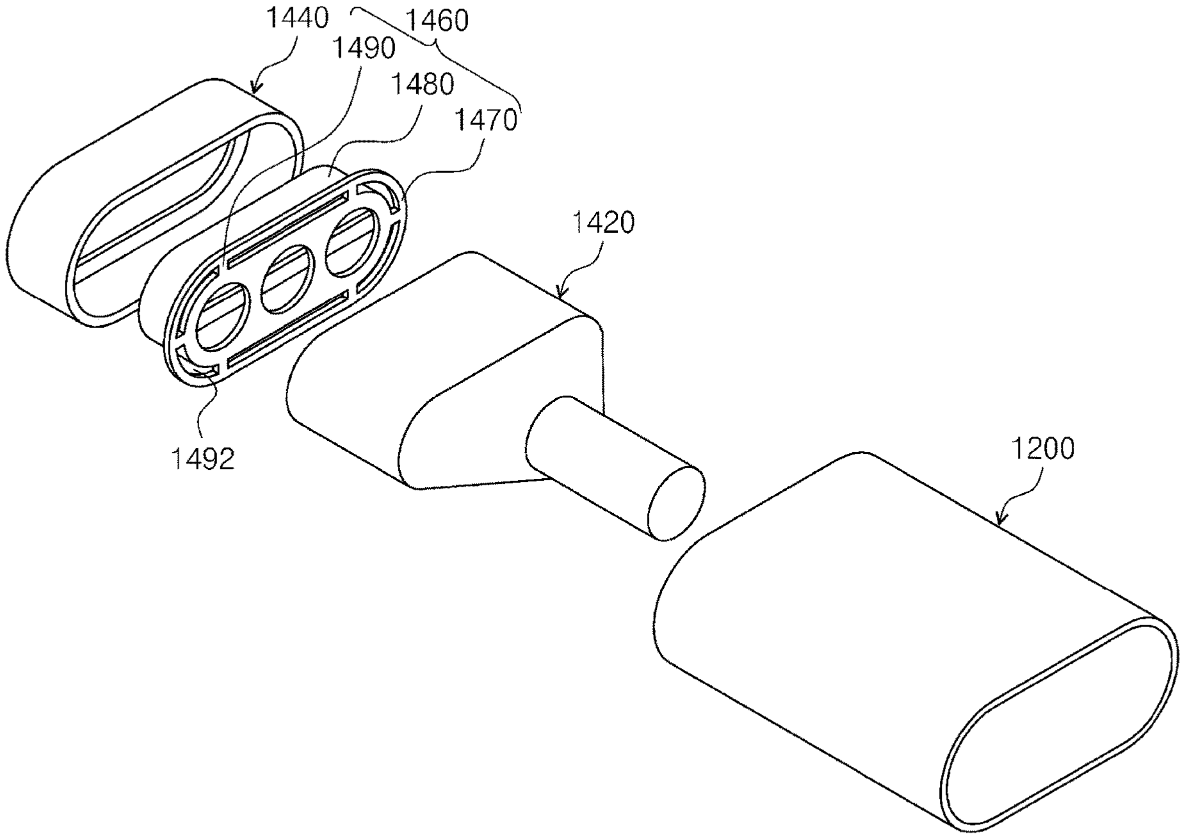
FIG. 7 is an exploded perspective view of the home port of FIG. 6.

Referring to FIGS. 6 and 7, the home port 490 has a drain cup 1200 and a housing 1400. The drain cup 1200 has an accommodation space 1202 of which the upper portion is opened. An upper region of the drain cup 1200 may be provided in a wider area than a lower region. When viewed from the top, the upper region of the drain cup 1200 has a long length in one direction. The longitudinal direction of the drain cup 1200 is provided in parallel to an arrangement direction of the nozzle members 464 when the nozzle unit 460 is positioned at the waiting location.

A drain port 1204 may be formed on the bottom of the accommodation space 1202, and a drain pipe 1206 may be connected to the drain port 1204. An opening/closing valve 1206*a* is installed in the drain pipe 1206. The treating liquid ejected from the nozzles 467 is accommodated in the accommodation space 1202 of the drain cup 1200 during auto-dispense or pre-dispense, and then, discharged to the outside of the drain cup 1200 through the drain pipe 1206.

The housing 1400 is positioned to cover the drain cup 1200. According to an example, the housing 1400 is placed to totally cover the upper portion, the lower portion, and the side portion of the drain cup 1200. An exhaust port 1402 is formed on a lower wall 1426 of the housing 1400, and an exhaust pipe 1404 is connected to the exhaust port 1402. A depressurization member 1406 and a valve 1404*a* are installed in the exhaust pipe 1404. A pump may be used as the depressurization member 1406. As a result, negative pressure is provided in the housing 1400 to exhaust an atmosphere inside the housing 1400.

The housing 1400 has a lower body 1420, an upper body 1440, and an insertion body 1460. The lower body 1420 covers the lower portion and the side portion of the drain cup 1200. The lower body 1420 has a side wall 1422 and a lower wall 1424. When viewed from the top, the side wall 1422 of the lower body 1420 may be provided in a larger size than the drain cup 1200 and in a similar shape as the drain cup 1200. A separation space provided between the drain cup 1200 and the lower body 1420 serves as an exhaust space 1428. The exhaust port 1402 may be formed on the lower wall 1424 of the lower body 1420. The fume generated from the treating liquid which resides in the accommodation space 1202 of the drain cup 1200 flows to the exhaust space 1428 through a first exhaust passage 1620 to be described below, and then exhausted to the exhaust pipe 1404. The upper end of the side wall 1422 in the lower body 1420 is positioned to be higher than the upper end of the drain cup 1200.

The upper body 1440 is positioned above the lower body 1420. The upper body 1440 has a side wall 1442 and an upper wall 1444. When viewed from the top, the side wall 1442 of the upper body 1440 has a size and a shape corresponding to the side wall 1422 of the lower body 1420. An inlet 1444*a* is formed on the upper wall 1444 of the upper body 1440. The treating liquid ejected from the nozzle unit 460 is introduced into the accommodation space 1202 of the drain cup 1200 through the inlet 1444*a*.

The insertion body 1460 is positioned above the drain cup 1200. The insertion body 1460 provides the first exhaust passage 1620 and a second exhaust passage 1640 in the housing 1400. The insertion body 1460 is positioned between the upper wall 1444 of the upper body 1440 and the upper end of the drain cup 1200. The insertion body 1460 is spaced from the upper wall 1444 of the upper body 1440 in the vertical direction. The insertion body 1460 is also spaced from the upper end of the drain cup 1200 in the vertical direction. A first clearance provided between the lower end of the insertion body 1460 and the upper end of the drain cup 1200 serves as the first exhaust passage 1620, and a second clearance provided between the upper end of the insertion body 1460 and the upper wall 1444 of the upper body 1440 serves as the second exhaust passage 1640. The first clearance is provided in the ring shape. Further, the second clearance is provided in the ring shape. The first clearance and the second clearance may be provided in the same size.

The first clearance and the second clearance may be provided in different sizes. The sizes of the first clearance and the second clearance are provided to be different from each other to change each of the quantity of fumes exhausted through the first exhaust passage and the quantity of fumes exhausted through the second exhaust passage.

The insertion body 1460 has a support base 1470 and a body 1480. The support base 1470 has the ring shape. When viewed from the top, the support base 1470 has a size and a shape corresponding to the side wall 1422 of the lower body 1420. The support base 1470 is positioned between the side wall 1442 of the upper body 1440 and the side wall 1422 of the lower body 1420. For example, the support base 1470 is placed on the upper end of the side wall 1422 of the lower body 1420, and the side wall 1442 of the upper body 1440 is placed on the upper end of the support base 1470.

A length of the body 1480 in the vertical direction is provided to be longer than the first clearance and the second clearance. The body 1480 has a side wall 1482, an upper wall 1484, and a lower wall 1486. The side wall 1482 of the body 1480 has the ring shape. The side wall 1482 of the body 1480 may be provided as a blocking face without a hole. When viewed from the top, the side wall 1480 of the body 1482 may have a size and a shape corresponding to the drain cup 1200.

A plurality of holes 1486*a* is formed on the lower wall 1486 of the body 1480. The holes 1486*a* may be provided in the same number as the number of nozzles 467 provided in the nozzle unit 460. When viewed from the top, each hole 1486 is provided at a location overlapped with each nozzle 467 in a state in which the nozzle unit 460 is positioned at the waiting location. An opening 1484*a* is formed on the upper wall 1484 of the body 1480. A size and a shape of the opening 1484*a* formed on the upper wall 1484 of the body 1480 may be provided in the size and the shape of the opening 1444*a* formed on the upper wall 1444 of the upper body 1440. Further, when viewed from the top, the opening 1484*a* formed on the upper wall 1484 of the body 1480 is positioned to overlap with the inlet 1444*a* formed on the upper wall 1444 of the upper body 1440. The opening 1484*a* formed on the upper wall 1484 of the body 1480 and the holes 1486*a* of the lower wall 1486 of the body 1480 serve as a through hole through which the treating liquid ejected from the nozzles 467 passes.

The body 1480 is supported on the support base 1470 by a connection rod 1490. According to an example, the support base 1470 is positioned at the same height as the lower wall 1420 of the body 1480. A plurality of connection rods 1490 is provided along a circumference of the support base 1470. The connection rods 1490 are positioned to be spaced apart from each other. A separation space 1492 between adjacent connection nodes 1490 is provided as a passage in which the fume exhausted through the second exhaust passage 1640 flows toward the exhaust pipe 1404.

In the above-described structure, the first exhaust passage 1620 is positioned at a height lower than the second exhaust passage 1640. The first exhaust passage 1620 is positioned more adjacent to the drain cup 1200 than the second exhaust passage 1640. Further, the second exhaust passage 1640 is positioned more adjacent to the upper wall of the upper body 1440 than the first exhaust passage 1620. An exhaust route from the first exhaust passage 1620 to the exhaust pipe 1404 is provided to be shorter than an exhaust route from the second exhaust passage 1640 to the exhaust pipe 1404.

Figure 8:
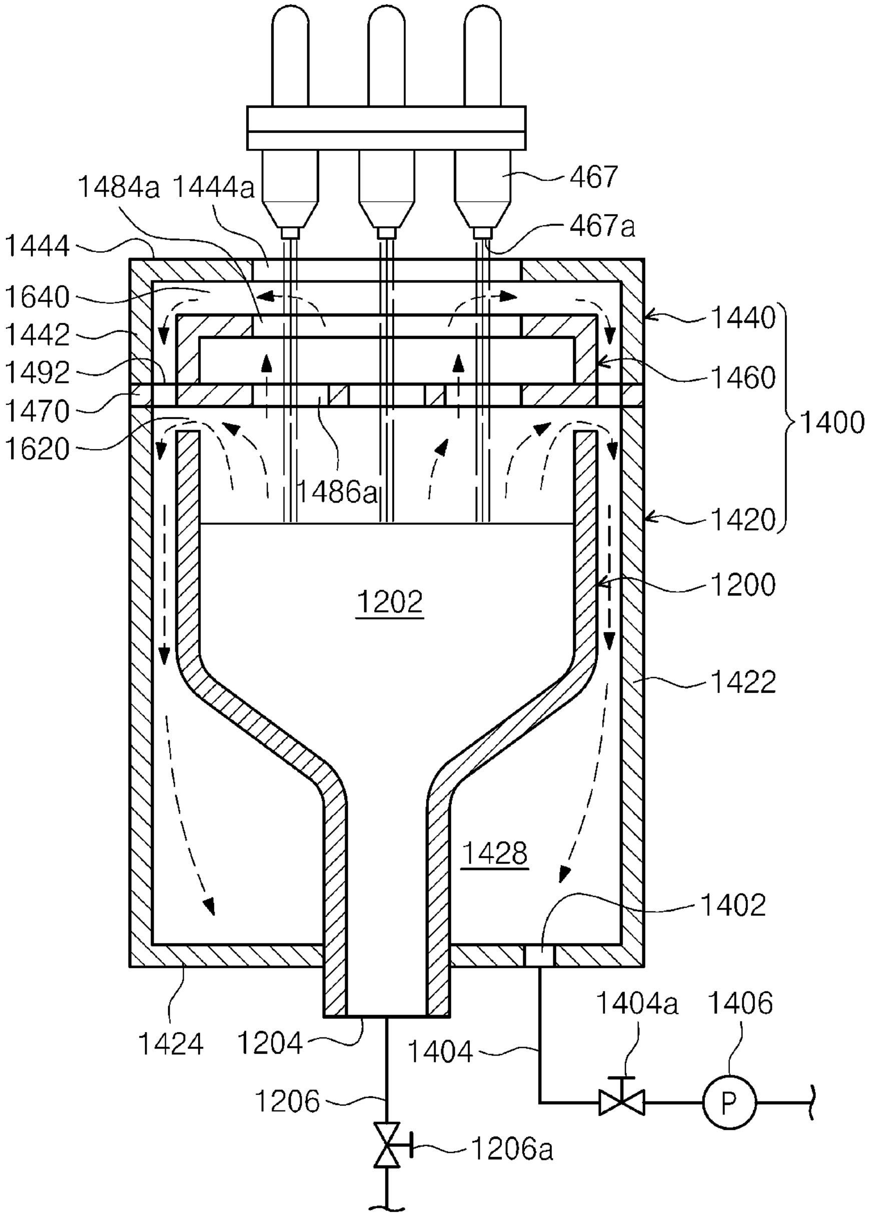
FIG. 8 is a diagram illustrating a state in which the fume is discharged from the home port of FIG. 6.

FIG. 8 illustrates a state in which the fume is discharged from the home port of FIG. 6. When the nozzle unit 460 is positioned at the waiting location, the treating liquid is ejected from the nozzles 467 during the pre-dispense or auto-dispense operation. Ejection ends of the nozzles 467 are positioned to be higher than the home port 490. The ejection ends 467*a* of the nozzles 467 may be positioned adjacent to the upper wall 1444 of the upper body 1440. In FIG. 8, it is illustrated that the treating liquid is simultaneously ejected from all nozzles 467. However, unlike this, the treating liquid may be ejected only from a selected nozzle 467 among the plurality of nozzles 467.

The treating liquid drops downward through the inlet 1444*a* formed on the upper wall 1444 of the upper body 1440, the opening 1484*a* formed on the upper wall 1484 of the body 1480, and the hole 1486*a* formed on the lower wall 1486 of the body 1480, and accommodated in the accommodation space 1202 of the drain cup 1200. The treating liquid accommodated in the accommodation space 1202 is exhausted to the outside of the accommodation space 1202 through the drain pipe 1206. When the treating liquid includes the acid or alkali component, the fume is generated from the treating liquid while the treating liquid resides in the accommodation space 1202. The fume flows upward in the accommodation space 1202, and most of the fumes are introduced into the exhaust space 1428 formed between the drain cup 1200 and the lower body 1420 through the first exhaust passage 1620. Thereafter, the fumes are exhausted to the outside through the exhaust pipe 1404 coupled to the lower body 1420.

Some of the fumes are not exhausted to the first exhaust passage 1620, but flow upward through the body 1480. The fumes flow to a passage between the drain cup 1200 and the upper body 1440 through the second exhaust passage 1640. Thereafter, the fumes flow to the exhaust space 1428 provided between the drain cup 1200 and the lower body 1420 through a space 1492 formed between the support base 1470 and the body 1480, and then is exhausted to the outside through the exhaust pipe 1404.

Further, the fume is generated from the treating liquid even while the treating liquid is ejected from the nozzle 467. In this case, the generated fume is introduced into the exhaust space 1428 through the first exhaust passage 1620 or the second exhaust passage 1640 according to a generation location thereof.

According to the exemplary embodiment of FIG. 6, most the fumes generated from the treating liquid are exhausted through the first exhaust passage 1620 distantly separated from the nozzle 467. Therefore, the fumes reach the nozzle 467 to minimize a large quantity of fumes attached to the outer surface of the nozzle 467. Further, a small quantity of fumes not exhausted through the first exhaust passage 1620 are exhausted through the second exhaust passage 1640. Therefore, the fumes are discharged to the outside of the home port 490 to minimize contamination of the nozzle 467 and a peripheral device.

Further, the lower wall 1486 with the hole 1486*a* is provided to the body 1480, and as a result, more fumes may be exhausted through the first exhaust passage 1620 than a case where the lower wall 1486 is not provided to the body 1480.

Further, according to the exemplary embodiment of FIG. 6, the fume which flows to the first exhaust passage 1620 and the fume which flows to the second exhaust passage 1640 are introduced into the same exhaust space 1428. In this case, since the first exhaust passage 1620 is positioned further adjacent to the exhaust pipe 1404 than the second exhaust passage 1640, higher negative pressure is provided to the first exhaust passage 1620 than the second exhaust passage 1640. As a result, a larger quantity of fumes may be discharged by using the first exhaust passage 1620.

Figure 9:
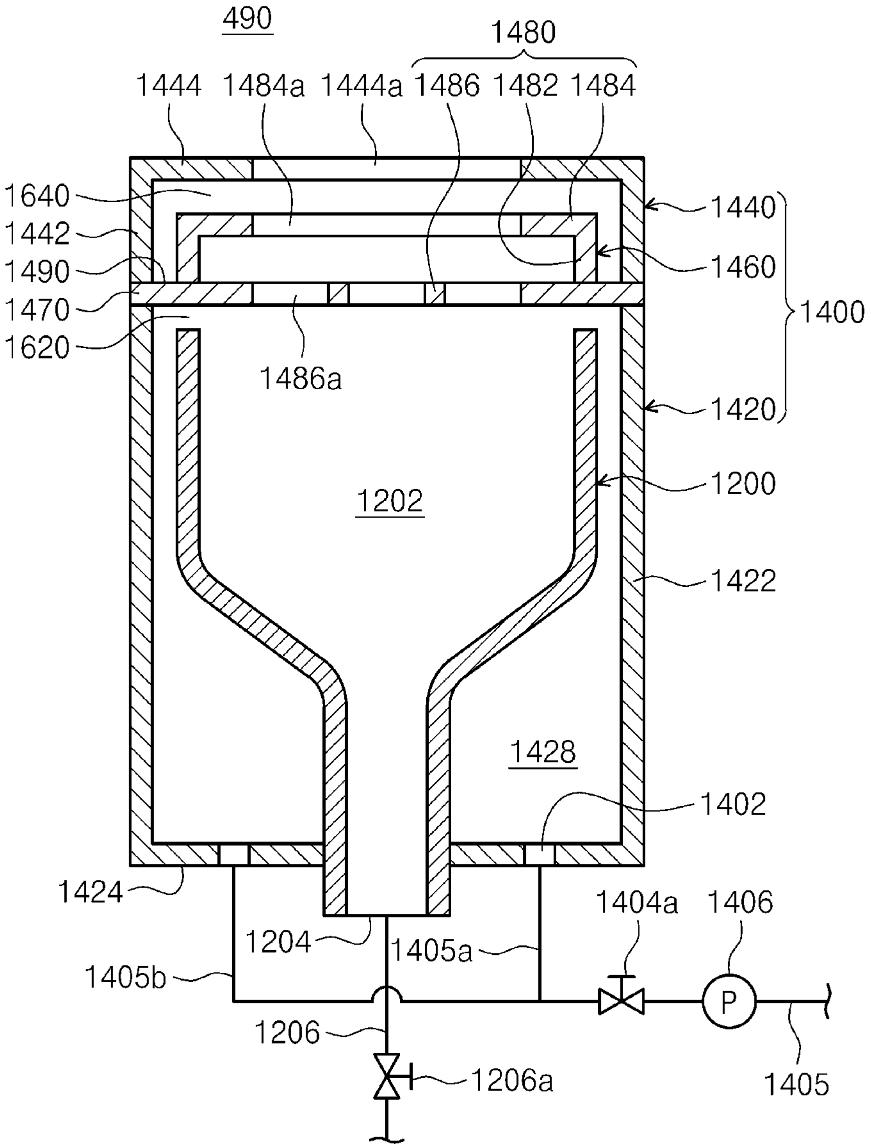
FIG. 9 is a diagram schematically illustrating a modified example of the home port of FIG. 6.

In the above-described example, it is illustrated that one exhaust pipe 1404 is coupled to the lower body 1420. However, unlike this, as illustrated in FIG. 9, a plurality of exhaust pipes 1404*a* and 1404*b* may be coupled to the lower body 1420 of the home port 490, and the exhaust pipes 1404*a* and 1404*b* may be connected to an integrated exhaust pipe 1405 in which the pump 1406 is installed. In this case, larger negative pressure may be provided between the drain cup 1200 and the housing 1400.

Figure 11:
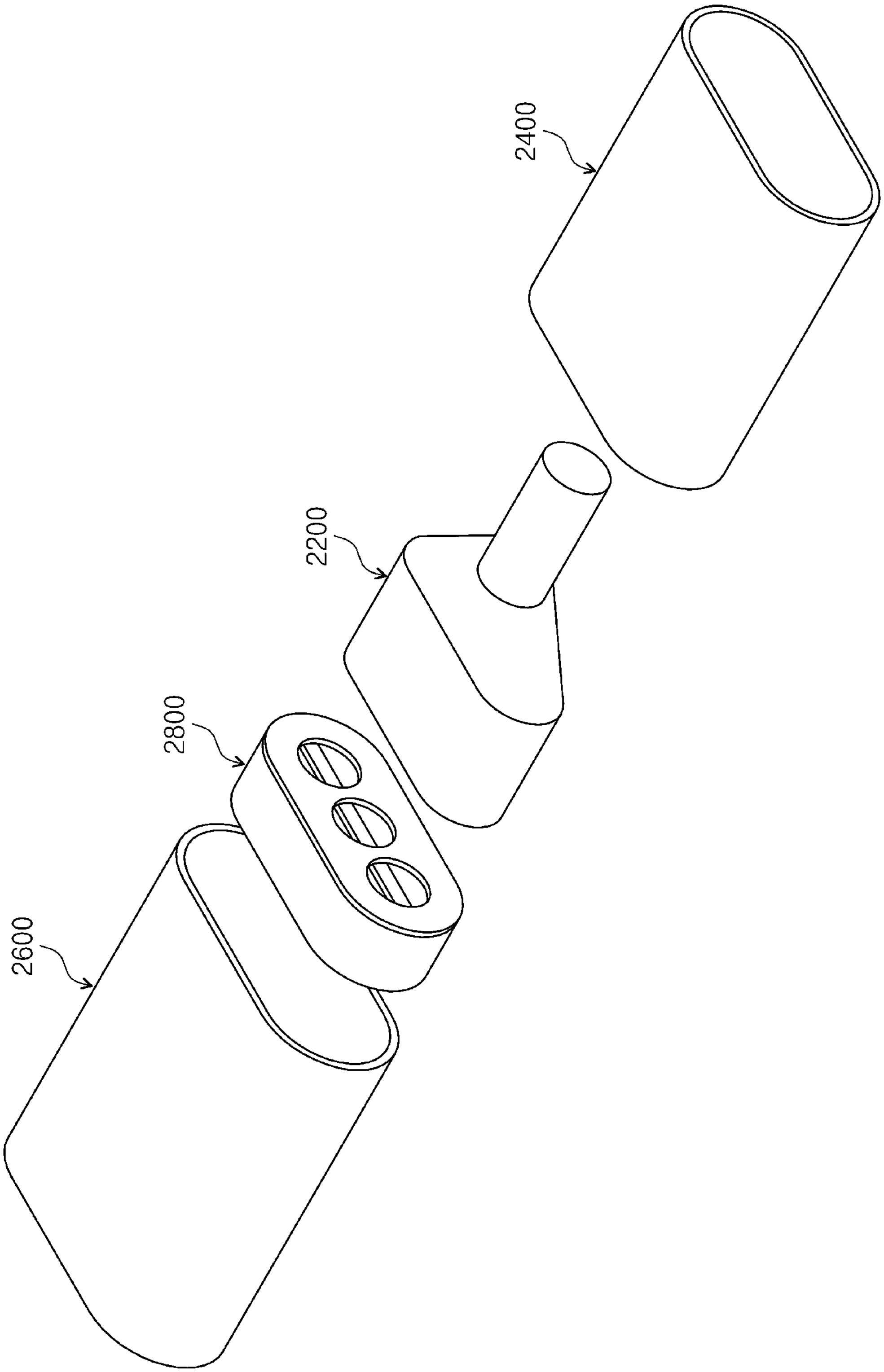
FIG. 11 is an exploded perspective view of the home port of FIG. 10.

FIG. 10 is a cross-sectional view schematically illustrating another exemplary embodiment of the home port of FIG. 6 and FIG. 11 is an exploded perspective view of the home port of FIG. 10.

Referring to FIG. 10, a home port 490*a* has a drain cup 2200, inner housing 2400, an outer housing 2600, and an insertion body 2600. The drain cup 2200 may have a similar structure to the drain cup 2200 of FIG. 6.

The inner housing 2400 is positioned to cover the drain cup 2200. The inner housing 2400 is placed to cover the lower portion and the side portion of the drain cup 2200. An exhaust port 2402 is formed on the lower wall of the inner housing 2400, and a first exhaust pipe 2404 is connected to the exhaust port 2402. Negative pressure is provided in the inner housing 2400 by the first exhaust pipe 2404 to exhaust the atmosphere in the inner housing 2400. The separation space is provided between an outer wall of the drain cup 2200 and a side wall of the inner housing 2400. The separation space is provided to a first exhaust space 2428. The fume generated from the treating liquid which resides in the accommodation space 2202 of the drain cup 2200 is introduced into the first exhaust space 2428, and then exhausted to the outside of the inner housing 2400 through the first exhaust pipe 2404. The upper end of the side wall 2440 in the inner housing 2400 is positioned to be higher than the upper end of the drain cup 2200. According to an example, the inner housing 2400 may be provided in a similar structure to the lower body 1420 of the housing 1400 in the home port 490 of FIG. 6.

The insertion body 2600 is positioned above the inner housing 2400. The insertion body 2600 has the body 2802. The body 2802 is placed on the inner housing 2400. The body 2802 has a side wall 2820, an upper wall 2840, and a lower wall 2860. The side wall 2802 of the body 2802 has the ring shape. The side wall of the body 2802 may be provided as the blocking face without the hole. When viewed from the top, the side wall 2820 of the body 2802 may have a size and a shape corresponding to the inner housing 2400. A plurality of holes 2860*a* is formed on the lower wall 2860 of the body 2802. The holes 2860*a* may be provided in the same number as the number of nozzles 467 provided in the nozzle unit 460. When viewed from the top, each hole 2860*a* is provided at a location overlapped with each nozzle 467 in a state in which the nozzle unit 460 is positioned at the waiting location. An opening 2840*a* is formed on the upper wall 2840 of the body 2802. The opening 2840*a* formed on the upper wall 2840 of the body 2802 and the holes 2860*a* of the lower wall 2860 of the body 2802 serve as the through hole through which the treating liquid ejected from the nozzles 467 passes.

The outer housing 2600 is placed to cover the inner housing 2400 and the insertion body 2600. The outer housing 2600 is placed to totally cover the upper portions, the lower portions, and the side portions of the inner housing 2400 and the insertion body 2600. An exhaust port 2402 is formed on the lower wall 2602 of the outer housing 2600, and a second exhaust pipe 2604 is connected to the exhaust port 2402. As a result, negative pressure is provided in the outer housing 2600 to exhaust the inside of the outer housing 2600. An inlet 2640*a* is formed on the upper wall 2640 of the outer housing 2600. The separation space is provided between the inner housing 2400 and the outer housing 2600, and between the drain cup 2200 and the outer housing 2600. The separation space is provided as a second exhaust space 2628. The fume generated from the treating liquid which resides in the accommodation space 2202 of the drain cup 2200 is introduced into the second exhaust space 2628 through the second passage, and then exhausted to the outside of the outer housing 2600 through the second exhaust pipe 2604.

The insertion body 2600 provides a first exhaust passage 2920 and a second exhaust passage 2940. The insertion body 2600 is positioned between the upper end of the drain cup 2200 and the upper wall of the outer housing 2600. The insertion body 2600 is spaced from the upper wall of the outer housing 2600 in the vertical direction. Further, the insertion body 2600 is positioned to be spaced apart from the upper end of the drain cup 2200 in the vertical direction. The first clearance formed between the lower end of the insertion body 2600 and the upper end of the drain cup 2200 serves as the first exhaust passage 2920. The second clearance formed between the upper end of the insertion body 2600 and the upper wall 2640 of the outer housing 2600 serves as the second exhaust passage 2940. The first clearance is provided in the ring shape. Further, the second clearance is provided in the ring shape. The first clearance and the second clearance may be provided in the same size.

In the above-described structure, the first exhaust passage 2920 is positioned at a height lower than the second exhaust passage 2940. The first exhaust passage 2920 is positioned more adjacent to the drain cup 2200 than the second exhaust passage 2940. Further, the second exhaust passage 2940 is positioned more adjacent to the upper wall of the outer housing 2600 than the first exhaust passage 2920.

According to an example, as illustrated in FIG. 10, the first exhaust pipe 2404 and the second exhaust pipe 2604 may be connected to the integrated exhaust pipe 2504, and the pump 2506 and the valve 2504*a* may be installed in the integrated exhaust pipe 2504. In this case, the same negative pressure may be provided to the inner housing 2400 and the outer housing 2600. Optionally, as illustrated in FIG. 12, the valves 2404*a* and 2604*a* are installed in the first exhaust pipe 2404 and the second exhaust pipe 2604, respectively, and opening rates of the valves 2404*a* and 2604*a* are adjusted to provide different negative pressures to the inner housing 2404 and the outer housing 2600. Optionally, as illustrated in FIG. 13, the pumps 2506*a* and 2506*b* are installed in the first exhaust pipe 2404 and the second exhaust pipe 2604, respectively to adjust the negative pressures provided to the inner housing 2404 and the outer housing 2600, respectively.

FIG. 14 illustrates a state in which the fume is discharged from the home port of FIG. 10. The treating liquid is ejected form the nozzles 467 during the pre-dispense operation or the auto dispense operation. In FIG. 14, it is illustrated that the treating liquid is simultaneously ejected from all nozzles 467. However, unlike this, the treating liquid may be ejected only from a selected nozzle 467 among the plurality of nozzles 467. The treating liquid drops downward through the inlet 2640*a* formed on the upper wall 2600 of the outer housing 2600, the opening 2840*a* formed on the upper wall 2840 of the body 2802, and the hole 2860*a* formed on the lower wall 2860 of the body 2802, and accommodated in the accommodation space 2202 of the drain cup 2200. The treating liquid accommodated in the accommodation space 2202 is exhausted to the outside of the accommodation space 2206 through the drain pipe 2202. When the treating liquid includes the acid or alkali component, the fume is generated from the treating liquid while the treating liquid resides in the accommodation space 2202. The fume flows upward in the accommodation space 2202, and most of the fumes are introduced into the first exhaust space 2428 provided between the drain cup 2200 and the inner housing 2400 through the first exhaust passage 2920. Thereafter, the fumes are exhausted to the outside through the first exhaust pipe 2404 coupled to the inner housing 2400. Some of the fumes are not exhausted to the first exhaust passage 2920, but flow upward through the insertion body 2600. The fumes are introduced into the second exhaust space 2428 formed between the drain cup 2200 and the outer housing 2600 through the second exhaust passage 2940. Thereafter, the fumes are exhausted to the outside of the outer housing 2600 through the second exhaust pipe 2604 coupled to the outer housing 2600.

In FIG. 6, it is described that the nozzle unit 460 includes the plurality of nozzles 467, and the treating liquid is supplied from all of the plurality of nozzles 467 or the selected nozzle 467 to the home port 490*a*. However, unlike this, as illustrated in FIG. 15, the nozzle unit 460 includes only one nozzle 467, and the home port 490*b* may be provided in a shape corresponding thereto. In this case, the home port 490*b* may be provided in a circular shape when viewed from the top.

In the above-described example, it is described as an example that the substrate treating apparatus is an apparatus that cleans the substrate. However the technical spirit of the present invention may also be applied to an apparatus that performs different types of processes including the home port in which the nozzle liquid-processing the substrate waits. For example, the home port of the present invention may be provided to an apparatus including a nozzle that supplies a photoresist or a development liquid.

The foregoing detailed description illustrates the present invention. Further, the above content shows and describes the exemplary embodiment of the present invention, and the present invention can be used in various other combinations, modifications, and environments. That is, the foregoing content may be modified or corrected within the scope of the concept of the invention disclosed in the present specification, the scope equivalent to that of the disclosure, and/or the scope of the skill or knowledge in the art. The foregoing exemplary embodiment describes the best state for implementing the technical spirit of the present invention, and various changes required in specific application fields and uses of the present invention are possible. Accordingly, the detailed description of the invention above is not intended to limit the invention to the disclosed embodiment. Further, the accompanying claims should be construed to include other embodiments as well.

What is claimed is:

1. An apparatus for treating a substrate, the apparatus comprising:

a liquid treating chamber configured to treat a substrate with a liquid;

a home port provided outside a treating unit of the liquid treating chamber; and a nozzle unit supplying a treating liquid to a substrate positioned in the treating unit, and having a nozzle provided to be movable between a process location at which the treating unit performs the liquid-treating for the substrate and a waiting location of waiting in the home port, wherein the home port includes:

a drain cup having an accommodation space accommodating the treating liquid ejected from the nozzle;

a housing provided to cover the drain cup and having an exhaust space which exhausts fumes generated from the treating liquid;

a first exhaust passage and a second exhaust passage through which the fumes generated from the treating liquid in the drain cup flows to the exhaust space are provided in the home port, wherein the second exhaust passage is positioned above the first exhaust passage; and an insertion body having a through hole penetrated in a vertical direction, wherein the insertion body has a body positioned to be spaced apart from an inner wall of the housing, wherein the body is placed at a location higher than the drain cup and lower than the upper wall of the housing, wherein a first clearance between the body and the drain cup is provided as the first exhaust passage, and wherein a second clearance between the body and the upper wall of the housing is provided as the second exhaust passage.

2. The apparatus of claim 1, wherein the housing includes a lower body covering a side portion and a lower portion of the drain cup, and an upper body positioned above the lower body, the insertion body further includes a support base, and connection rods connecting the body and the support base, wherein an upper end of the lower body is positioned to be higher than an upper end of the drain cup, wherein a bottom of the support base is supported by the lower body, wherein the upper body is supported by the support base, and wherein the fumes exhausted through the second exhaust passage is provided to flow to the exhaust space through a space between the connection rods.

3. The apparatus of claim 1, wherein a length of the body in the vertical direction is provided to be larger than the first clearance and the second clearance.

4. The apparatus of claim 1, wherein the fumes exhausted through the first exhaust passage and the fumes exhausted through the second exhaust passage are exhausted through the same exhaust space.

5. The apparatus of claim 4, wherein an exhaust pipe in which a pump is installed is connected to the exhaust space, and wherein an exhaust route from the first exhaust passage up to the exhaust pipe is provided to be shorter than an exhaust route from the second exhaust passage up to the exhaust pipe.

6. An apparatus for treating a substrate, the apparatus comprising:

a liquid treating chamber configured to treat a substrate with a liquid;

a home port provided outside a treating unit of the liquid treating chamber; and a nozzle unit supplying a treating liquid to a substrate positioned in the treating unit, and having a nozzle provided to be movable between a process location at which the treating unit performs the liquid-treating for the substrate and a waiting location of waiting in the home port, wherein the home port includes:

a drain cup having an accommodation space accommodating the treating liquid ejected from the nozzle;

a housing provided to cover the drain cup and having an exhaust space which exhausts fumes generated from the treating liquid;

a first exhaust passage and a second exhaust passage through which the fumes generated from the treating liquid in the drain cup flows to the exhaust space are provided in the home port, wherein the second exhaust passage is positioned above the first exhaust passage, and an insertion body having a through hole penetrated in a vertical direction, wherein the exhaust space includes a first exhaust space and a second exhaust space, and wherein the housing further includes:

an inner housing placed to cover the drain cup, and having the first exhaust space from the drain cup, and an outer housing placed to cover the inner housing, and having the second exhaust space from the inner housing, wherein the fumes which flow through the first exhaust passage are connected to the first exhaust space, wherein the second exhaust passage is connected to the second exhaust space, wherein the insertion body has a body, wherein the body is placed at a location higher than the drain cup and lower than the upper wall of the outer housing, wherein a first clearance between the body and the drain cup is provided as the first exhaust passage, and wherein a second clearance between the body and the upper wall of the outer housing is provided as the second exhaust passage.

7. The apparatus of claim 6, wherein an upper end of the inner housing is positioned at a location higher than the upper end of the drain cup, and wherein a lower end of the body is supported by the upper end of the inner housing.

8. The apparatus of claim 6, wherein a first exhaust pipe is connected to the first exhaust space, wherein a second exhaust pipe is connected to the second exhaust space, wherein the first exhaust pipe and the second exhaust pipe are connected to an integrated exhaust pipe, and wherein a pump is installed in the integrated exhaust pipe.

9. The apparatus of claim 1, wherein the nozzle unit includes:

a base block, and a plurality of nozzle members coupled to the base block and having ejection ends.

10. An apparatus for treating a substrate, the apparatus comprising:

a liquid treating chamber configured to treat a substrate with a liquid;

a home port provided outside a treating unit of the liquid treating chamber; and a nozzle unit supplying a treating liquid to a substrate positioned in the treating unit, and having a nozzle provided to be movable between a process location at which the treating unit performs the liquid-treating for the substrate and a waiting location of waiting in the home port, wherein the home port includes:

a drain cup having an accommodation space accommodating the treating liquid ejected from the nozzle, a housing provided to cover the drain cup and having an exhaust space which exhausts fumes generated from the treating liquid, and an insertion body placed between an upper wall of the housing and the drain cup in the housing, wherein a first exhaust passage guiding fumes to the exhaust space is formed between the insertion body and the drain cup, wherein a second exhaust passage guiding the fumes to the exhaust space is formed between the insertion body and the housing, wherein the second exhaust passage is provided at a higher location than the first exhaust passage, wherein an exhaust pipe in which a depressurization member is installed is connected to the exhaust space, wherein an exhaust route from the first exhaust passage up to the exhaust pipe is provided to be shorter than an exhaust route from the second exhaust passage up to the exhaust pipe, wherein the insertion body has a through hole penetrated in a vertical direction, wherein the housing includes:

a lower body covering a side portion and a lower portion of the drain cup; and an upper body positioned above the lower body, and wherein the insertion body further includes:

a support base; and connection rods connecting the insertion body and the support base, wherein an upper end of the lower body is positioned to be higher than an upper end of the drain cup, wherein a bottom of the support base is supported by the lower body, wherein the upper body is supported by the support base, and wherein fumes exhausted through the second exhaust passage is provided to flow to the exhaust space through a space between the connection rods.

* * * * *